United States Patent [19]

Taft, 3rd et al.

[11] Patent Number: 5,385,428
[45] Date of Patent: Jan. 31, 1995

[54] WATER INTAKE FISH DIVERSION APPARATUS

[75] Inventors: Edward P. Taft, 3rd, Wellesley; Thomas C. Cook, Cohasset, both of Mass.

[73] Assignee: Electric Power Research Institute, Inc., Palo Alto, Calif.

[21] Appl. No.: 902,189

[22] Filed: Jun. 22, 1992

[51] Int. Cl.⁶ .................................................. E02B 8/08
[52] U.S. Cl. .......................................... 405/81; 405/127
[58] Field of Search ................... 405/81, 82, 83, 127; 210/154, 162

[56] References Cited

U.S. PATENT DOCUMENTS

| | | | |
|---|---|---|---|
| 1,825,169 | 9/1931 | Wyckoff | 405/81 X |
| 2,168,341 | 8/1939 | Holmes et al. | 405/81 |
| 4,526,494 | 7/1984 | Eicher | 405/81 X |
| 4,481,904 | 7/1985 | Fletcher | 405/81 X |
| 4,740,105 | 4/1988 | Wollander | 405/81 X |

FOREIGN PATENT DOCUMENTS 1102842  7/1984  U.S.S.R. .............................. 405/83

*Primary Examiner*—Dennis L. Taylor
*Attorney, Agent, or Firm*—James W. Maccoun

[57] ABSTRACT

A fish diversion apparatus uses a plane screen to divert fish for variety of types of water intakes in order to protect fish from injury and death. The apparatus permits selection of a relatively small screen angle, for example ten degrees, to minimize fish injury. The apparatus permits selection of a high water velocity, for example ten feet per second, to maximize power generation efficiency. The apparatus is especially suitable retrofit to existing water intakes. The apparatus is modular to allow use plural modules in parallel to adjust for water flow conditions. The apparatus has a floor, two opposite side walls, and a roof which define a water flow passage and a plane screen within the passage. The screen is oriented to divert fish into a fish bypass which carries fish to a safe discharge location. The dimensions of the floor, walls, and roof are selected to define the dimensions of the passage and to permit selection of the screen angle. The floor is bi-level with a level upstream of the screen and a level beneath screen selected to provide a uniform flow distribution through the screen. The apparatus may include separation walls to provide a water flow channel between the apparatus and the water intake. Lead walls may be used to adjust water flow conditions into the apparatus. The apparatus features stoplog guides near its upstream and downstream ends to permit the water flow passage to be dewatered.

19 Claims, 3 Drawing Sheets

WATER INTAKE FISH DIVERSION APPARATUS

BACKGROUND OF THE INVENTION

1. Field of Invention

This invention relates to fish protection apparatuses for water intakes. More specifically, this invention relates to protecting fish from injury and death resulting from fish entry into water intakes or from fish impingement upon intake screens intended to prevent fish from entering water intakes. This invention protects fish by safely preventing their entry into water intakes and diverting the fish to a selected safe release location.

2. Description of the Related Art

A variety of water users associated with power generation, industrial processes, potable water supplies, and agricultural developments divert water from natural and man-made fish habitats such as oceans, lakes, rivers and reservoirs. Water is diverted through water intakes to uses such as hydroelectric turbines, thermal power plant cooling systems, irrigation canals, industrial water uses, municipal water supplies, and desalination plants.

Water intakes exist in a variety of structures such as canal headworks, pump screenwells, towers, turbine intakes, and penstock intakes. Depending upon the particular site of interest, water intakes may divert water for a solitary system use or for a multiple system use. An example of the latter is four proximate penstock intakes drawing water from a reservoir to supply different turbine units.

Absent intervention for fish protection, fish may enter a water intake and be killed by the process that uses the diverted water. For example, fish entering some hydroelectric turbines may have mortality rates approaching one hundred percent. Fish entering other types of water intakes may also experience mortality rates of one hundred percent due to fish impingement on screens or due to fish entrapment in noninhabitable environments.

Safe passage of fish around hydroelectric projects, specifically hydraulic turbines which can cause injury and death, has for many years been the focus of extensive research. Unfortunately, those research efforts have resulted in the development of relatively few systems or devices which can be applied to reduce turbine passage of fish to a level sufficiently low to meet criteria set forth by state and federal fishery resource managers. Today, the potential negative impacts of fish passage through turbines remains a major unresolved issue in the licensing of the United States' existing and proposed hydroelectric developments. Therefore, a need remains for the development of an effective means to protect fish and thereby protect an economically and socially important natural resource.

Moreover, there is increasing recognition of a need to protect fish from entry into water intakes for diversions of various types in addition to water intakes for diverting water for hydroelectric turbines. However, current technologies, which are adapted specifically to meet the needs of hydroelectric turbines, are not necessarily well suited for water intakes for other types of diversions.

Fish protection apparatuses generally fall within one of four categories, based upon their mode of action. These categories are behavioral barriers, physical barriers, collection systems, and diversion systems. Behavioral barriers use natural behavior patterns to attract or repel fish. The latter three categories may employ screens of different designs. Physical barriers physically block fish passage. Collection systems actively collect fish for return to their original environment. Diversion systems divert fish to bypasses for return to their original environment. The present invention is a water intake fish diversion apparatus that relates to fish diversion apparatuses.

Fish protection apparatuses using screens suffer from the shortcoming of fish impingement which causes injury and mortality. Currently available fish diversion apparatuses employing screens which are acceptable to resource management agencies rely on low flow velocities, 0.4 to 1.0 feet per second ("fps"), to achieve minimal injury and mortality. A requirement for low water velocities may result in a fish protection apparatus which is not cost-effective; for example, high capital costs for the intake structure and less efficient electric power generation.

An existing diversion apparatus is shown in U.S. Pat. No. 4,526,494 entitled PENSTOCK FISH DIVERSION SYSTEM, hereinafter referred to as the "Eicher Penstock System." A penstock is a conduit, generally cylindrical and several feet in diameter, for conducting water. The Eicher patent discloses a fish diversion screen for a penstock supplying water to a hydroelectric turbine. The Eicher Penstock System utilizes existing cylindrical penstock walls as a water passage for water flow through a fish diversion screen. In one of its embodiments, two curved screens are employed, joined together along common linear edges while another embodiment employs a single elliptical inclined plane screen. For purposes herein, an inclined plane is defined as a plane that makes an oblique angle with the plane of the earth's horizon. The Electric Power Research Institute (EPRI), the assignee of the present application, conducted tests of the Eicher Penstock System at the Elwha Hydroelectric Project in Washington State during 1990 and 1991. The results of that testing indicate that the Eicher Penstock System can effectively divert salmonids in penstock water flow at high velocities to a bypass thereby substantially eliminating fish passage through a turbine.

While effective at the Elwha site, the Eicher Penstock System has several limitations. Employment of the Eicher Penstock System is limited to hydroelectric projects having penstocks. The Eicher Penstock System is not useful for water intakes other than penstocks such as those for pump screenwells, canals, and so forth. Use of existing penstock walls limits adjustment of water flow into the Eicher Penstock System and within the Eicher Penstock System while such adjustment may be required to provide a biologically effective diversion apparatus. The interior of a penstock is a difficult access location for repair and maintenance due to the difficulty in dewatering the fish diversion screen. A penstock location makes it difficult or impossible to bypass a fish diversion screen during periods when the screen's use is not necessary, for example, during periods of low fish migration activity. Location of a fish diversion screen in a penstock also creates difficulty in configuring a fish bypass for adjustment of the desired bypass velocity at headpond water levels since the penstock flow to its hydraulic turbines defines bypass flow rate. Finally, the Eicher Penstock System does not feature advantages presented by modularity since its penstock location limits to only one the number of Eicher Penstock Systems which may be used for a given penstock.

The limitations of the Eicher Penstock System inspire a need for an apparatus designed for use at the many hydroelectric projects which do not incorporate penstocks as well as designed for use at water intakes other than those for hydroelectric projects. The inventors of the present invention have developed a novel, modular fish diversion apparatus designed for application at hydroelectric sites which do not have penstocks, at sites where penstock application would not be cost-effective, and at sites which are water intakes for non-hydroelectric water uses. The apparatus safely diverts downstream migrating fish and reduces turbine injury and mortality of fish species which do not migrate. The compact nature of the apparatus, which is designed to function at relatively high water velocities, results in a substantial cost savings over conventional forebay screening apparatuses, such as travelling screens, in most applications. The apparatus is particularly suitable for retrofitting at sites where space limitations preclude installation of conventional screening apparatuses.

SUMMARY OF THE INVENTION WITH OBJECTS

It is a general object of the invention to provide an improved fish diversion apparatus.

It is one object of the invention to provide a fish diversion apparatus which is useful for a variety of different types of water intakes It is another object of the invention to provide a fish diversion apparatus which is capable of simultaneously servicing multiple water intakes.

It is another object of the invention to provide a fish diversion apparatus which is of relatively low cost to construct, operate, and maintain.

It is another object of the invention to provide a fish diversion apparatus which may be easily customized to accommodate given site or retrofit conditions.

It is another object of the invention to provide a fish diversion apparatus which is suitable for high velocity water flow.

It is another object of the invention to provide a fish diversion apparatus which easily and without interruption to plant operations allows water flow to bypass fish diversion screens when such screens are not needed for fish protection.

It is another object of the invention to provide a fish bypass which is accessible for removal of debris without the necessity of dewatering the screen.

It is still another object of the invention to provide a fish diversion apparatus which allows isolation of its fish diversion screen from water for ease in maintenance without adversely affecting plant performance.

These and other objects are accomplished with a novel water intake fish diversion apparatus. The apparatus configuration and number of apparatuses required at a specific site are dependent on the water flow rate, the site configuration, and the fish species to be protected. A modular approach allows considerable flexibility to provide suitable velocity conditions for particular fish species. As opposed to apparatuses limited to penstock applications, a modular configuration also allows initial and subsequent adjustments in the water approach velocity to maintain optimal fish passage conditions by addition of further apparatuses or modifications to previously installed apparatuses with minimal impacts to plant operations.

While the apparatus is disclosed with respect to hydroelectric applications, it should be understood to be equally applicable to water diversions of other types. Examples of other types of water diversions for which the apparatus is effective are industrial processes, power plant cooling systems, irrigation canals, industrial water uses, municipal water supplies, and desalination plants.

The apparatus has a floor, an interior roof (that is, a ceiling), and two walls defining a water flow passage for permitting water movement downstream through the water flow passage. A union of the downstream end of the water flow passage and a water intake causes water to flow out of the water flow passage into the water intake. The floor, interior roof, and walls are constructed of reinforced concrete, structural steel, or steel plate. In one embodiment, the union of the apparatus and the water intake is made by abutting the downstream end of the apparatus against the water intake. In another embodiment, the union is made by using separation walls, that is, two walls interposed between the downstream end of the apparatus and the water intake such that the separation walls channel water discharged by the apparatus to the water intake. The separation walls are made of steel, sheetpile or reinforced concrete.

The apparatus is especially useful for fish diversion at water intakes that lack a confined passageway as is featured in penstocks. The apparatus also provides flexibility in design to accommodate various water intake configurations, such as a single apparatus with separation walls that is able to service multiple water intakes. An advantage presented by the apparatus' ability to use separation walls is the opportunity to adapt different water flows for the apparatus without affecting the water intake flow rate. The modular apparatus design also permits incorporation of a recessed apparatus floor to optimize hydraulic flow conditions for fish passage.

The apparatus uses a plane screen in its water flow passage and a fish bypass such that the screen diverts fish from water moving through the apparatus into the fish bypass for deposit at the safe release location. Except for the portion of water flowing through the fish bypass, the water moving through the apparatus is discharged from the downstream end of the apparatus into the water intake. The plane screen may have an orientation that is an inclined plane or the plane screen may have an orientation that is an oblique angle to a reference plane other than the earth's horizon, such as a plane defined by a wall within the apparatus or such as the longitudinal axis of the water flow passage.

With a known water flow rate at any water intake, the apparatus provides flexibility to select the appropriate number and size of apparatuses to install in parallel to achieve a desired flow velocity for the fish species of concern. The individual fish bypasses of each apparatus can be joined into a common conduit for transport of diverted fish to a selected safe release location.

The apparatus has stoplogs both upstream and downstream of the screen to allow the interior of the apparatus to be dewatered for inspection and maintenance. Stoplogs function similarly to sliding gates which could be used as a substitute for stoplogs. Stoplogs in their normally-open position allow unimpeded water flow through the apparatus. In their closed position, stoplogs present a barrier to water access to the interior of the apparatus, such barrier allowing dewatering of the interior of the apparatus. Multiple apparatus installations allow dewatering of one apparatus for maintenance, or for other reasons, while allowing the water intake to be supplied by water flow through other apparatuses. The Eicher Penstock System does not feature such stoplogs due to its location within an existing penstock. Accordingly, the only means to maintain or repair the Eicher Penstock System is to close penstock intake gates which would require the power plant fed by that penstock to be shut down and would require river flow to be discharged through the project spillway causing loss of power generation potential.

The apparatus is designed to bypass fish at substantially higher velocities (up to 10 fps) than the Eicher Penstock System, resulting in significant cost savings through more efficient power generation. The apparatus can be adapted for original installation or retrofit for most types of water intake layouts.

The fish bypass in the apparatus is accessible by maintenance personnel for removal of debris which may enter the fish bypass. This access is provided by a deck that is above the interior roof of the apparatus. The Eicher Penstock System is only accessible for cleaning by dewatering the penstock.

An advantage of the apparatus is that, in many cases, the apparatus can be "bypassed" when it is not needed for fish protection. At many sites, fish movement occurs during specific, limited time periods. The apparatus can be incorporated into the headworks of a project in such a way that bypass gates can be opened when the fish diversion screen is not needed allowing water flow to the water intake to pass unimpeded by the fish diversion screen. This design feature also allows the apparatus to be isolated for maintenance without impacting operations.

DESCRIPTION OF THE PREFERRED EMBODIMENTS

Single Module Embodiment

Figure 1:
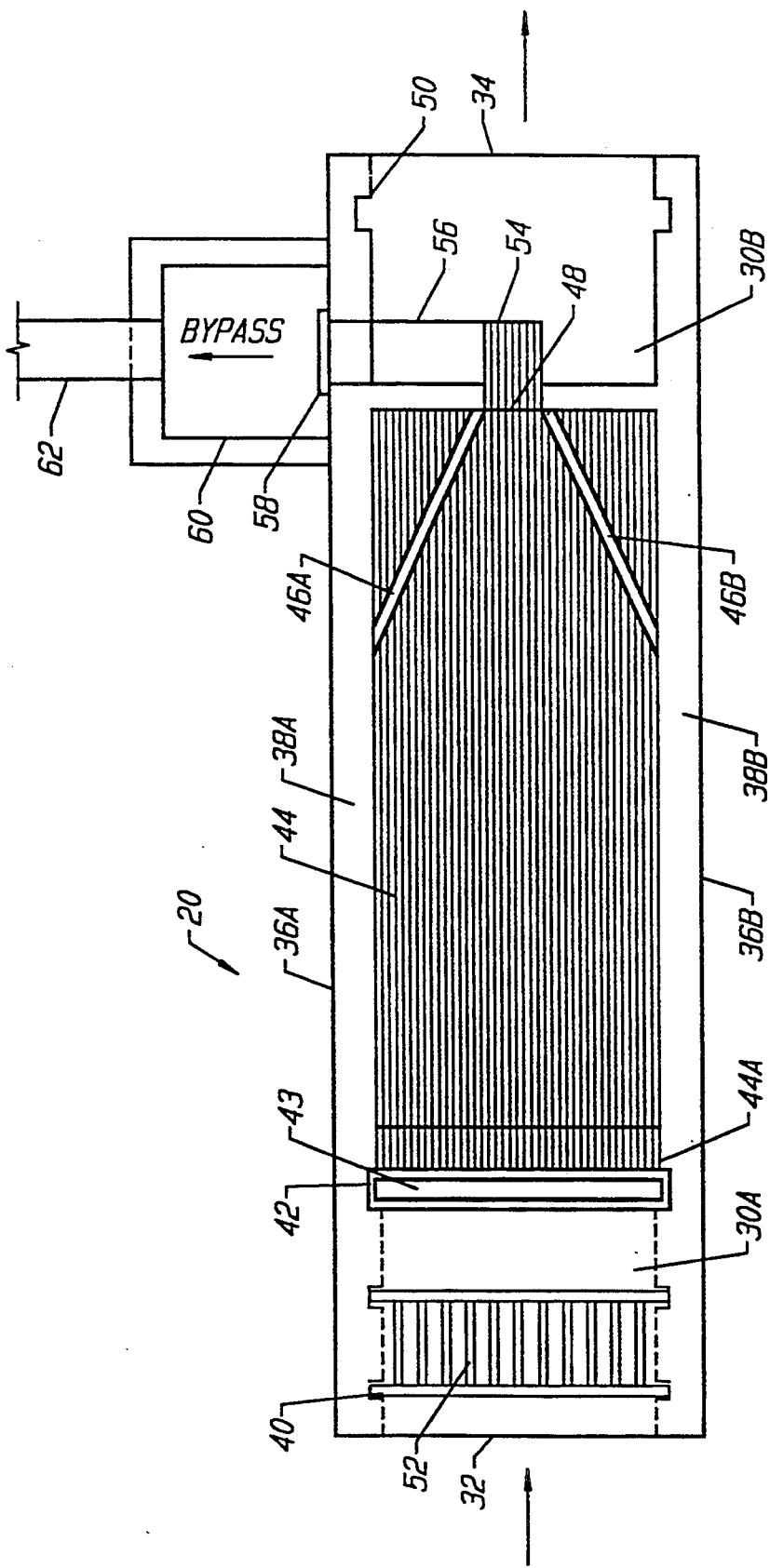
FIG. 1 is a top plan view, in section, of the apparatus.

Referring now to FIG. 1, there is shown an apparatus 20 in plan view, in section. The apparatus 20 has a bi-level floor 30a and 30b which is generally rectangular and, except as noted, generally horizontal. The rectangular shape of the floor 30a and 30b is defined by an upstream end 32, an downstream end 34, and two side edges 36a and 36b. The apparatus 20 has two side walls 38a and 38b which extend upward vertically from side edges 36a and 36b, respectively. The apparatus 20 receives water at the upstream end 32 with such water passing downstream over the floor 30a and 30b and between the two side walls 38a and 38b to be discharged from the apparatus 20 at the downstream end 34. In the preferred embodiment, the upstream end 32 and the downstream end 34 have an equal length that is relatively short compared to the length of the two side edges 36a and 36b. Sample dimensions of an apparatus 20 are an upstream end 32 and downstream end 34 length of fifteen feet and a side edge 36a and 36b combined length of forty-five feet.

The apparatus 20 has, in upstream to downstream order between the upstream end 32 and the downstream end 34, a trash rack 40, a stoplog guide 42 housing a stoplog 43, and a screen 44. Transition guide walls 46a and 46b are located above the screen 44. A bypass entrance 48 is immediately downstream of the screen 44 and a stoplog guide 50 is downstream of the bypass entrance 48. Transitions guide walls 46a and 46b are approximately eleven feet long.

The trash rack 40 is rectangular and extends upward from the floor 30a rising from upstream to downstream at a slope of one foot horizontal for each five feet vertical (1H:5V) thereby defining an acute angle with respect to the floor 30a under the trash rack 40. The trash rack 40 is ten feet wide and has trash bars 52 spaced at ten inches clear.

The screen 44 is generally rectangular and extends in length from the floor 30b upward, in an inclined plane rising from upstream to downstream thereby defining an acute angle with respect to the floor 30b underneath the screen 44. The screen 44 extends in width across the apparatus 20 from side wall 38a to side wall 38b. The angle of inclination between the floor 30b and the screen 44 is selected between ten degrees and twenty degrees, depending upon the fish species of interest and the selected design flow capacity, velocity of water approaching the apparatus, and the available water depth. A smaller angle of inclination, ten degrees for example, could result in a more biologically effective apparatus 20 while a larger angle of inclination, twenty degrees for example, could result in a lower capital cost for a biologically acceptable approach velocity. The length of the screen 44 is selected as a function of the angle between the floor 30b and the screen 44. The screen 44 is preferably constructed of wedgewire with bars arranged parallel to water flow. The screen 44 is, for example, ten feet wide by twenty-five feet long.

Floor 30a is approximately level with the screen lip 44a which forms the upstream end of the screen 44. Floor 30b is lower, approximately two and one-half feet lower, than floor 30a.

The transition guide walls 46a and 46b descend vertically to abut screen 44 when screen 44 is in its normally-closed position. Transition guide wall 46a extends downstream obliquely from side wall 38a to the bypass entrance 48. Transition guide wall 46b is located according to a mirror image of transition guide wall 46a with respect to an axis parallel to the side walls 38a, 38b and bisecting the screen 44. Transition guide walls 46a, 46b are constructed of steel plate and structural steel support.

The bypass entrance 48 is located downstream of and adjacent to the screen 44. The bypass entrance 48 is two feet wide measured along the width of the screen 44. The bypass entrance 48 rises vertically from the screen 44 to two feet above the screen 44. The bypass 54, which has horizontal dimensions of two feet square, turns vertically approximately one foot downstream of the bypass entrance 48. The bypass 54 communicates with a return sluice 56. The return sluice 56 is elongated to a desired length and is approximately two feet wide.

The return sluice 56 extends parallel to downstream end 34 across the apparatus 20 to side wall 38a to communicate with a two foot wide by two foot high bottom drop gate 58. The drop gate 58 communicates with a drop basin 60 located downstream of the bottom drop gate 58. The drop basin 60 communicates with a return pipe 62. The return pipe 62 communicates with a selectable fish discharge location.

Figure 2:
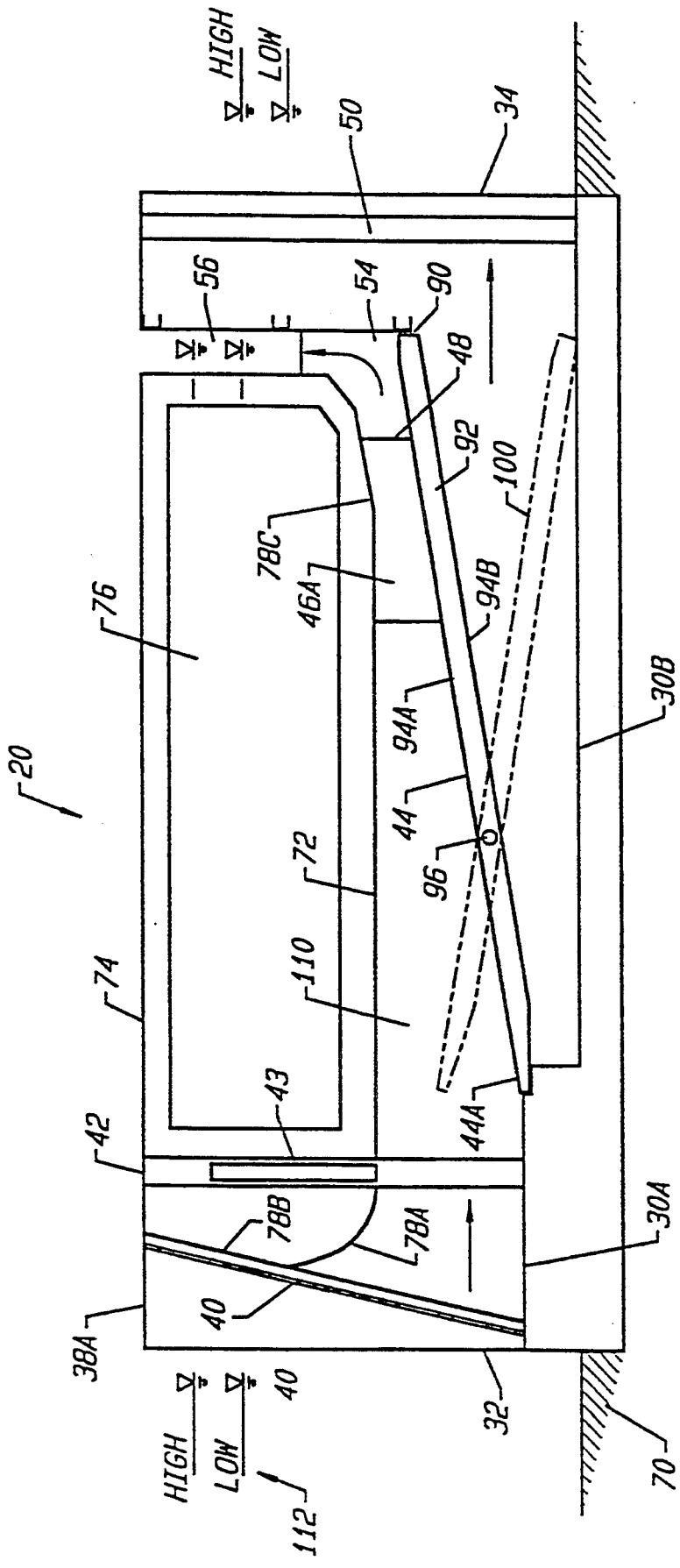
FIG. 2 is an elevation view, in section, of the apparatus.

Referring now to FIG. 2, there is shown an elevational view, in section, of the apparatus 20. The apparatus 20 is built into a substrate 70 which may consist of rock, soil, or sand, depending upon site conditions.

The apparatus has a rectangular roof 72 which is horizontal above floors 30a and 30b and supported by side walls 38a and 38b. A horizontal deck 74 is above roof 72. Filler 76 between roof 72 and deck 74 is selected from air, water, rock, sand, or another substance. Roof 72 extends from trash rack 40 downstream to the bypass 54. Roof 72 therefore extends over screen 44 which in turn extends over floor 30b. Roof 72 has rounded transition 78a located between trash rack 40 and stoplog guide 42. Roof transition 78a extends upstream to trash rack 40 to form bulkhead 78b. Roof transition 78c forms a bevelled junction joining roof 72 to bypass entrance 48. Transition guide walls 46a and 46b descend vertically from roof 72 to abut screen 44 when screen 44 is in its normally-closed position. Deck 74 is constructed of reinforced concrete and may also constructed of structural steel and steel plate or grating.

Trash rack 40 extends upward from floor 30a to transition 74a and further extends along bulkhead 76 to deck 74. Stoplog 43 is stored in place within stoplog guide 42 to provide a reasonably continuous roof 72.

Screen 44 has a two foot wide screen extension 90 which extends from bypass entrance 48 to under bypass 54. Screen extension 90 abuts bypass 54 when screen 44 is in its normally-closed position.

Screen 44 is supported by a structural steel frame 92. Screen 44 has, in its normally-closed position, an upstream face 94a and a downstream face 94b. Frame 92 is fastened to shaft 96. Shaft 96 is horizontal, elevated over floor 30b. Shaft 96 is perpendicular to and may be supported by side walls 38a and 38b. Screen 44 is pivoted on shaft 96 to cleaning position 100, shown in phantom.

It is to be understood that dimensions of apparatus 20 that are mentioned above, and dimensions and angles of components of apparatus 20 that are mentioned above are representative and other dimensions and angles may be employed while still enjoying the advantages offered by the apparatus 20. It is to be further understood that while the preferred embodiment discloses a plane screen in inclined plane orientation, the advantages of apparatus 20 may be obtained while orienting screen 44 at angles other than inclined plane angles. While screen 44 is generally rectangular, it may be a non-rectangular trapezoid.

Operation of Single Module Embodiment

The structural features of the apparatus 20 provide a water flow passage 110 defined by floors 30a and 30b, side walls 36a and 36b, and roof 72, each of which is constructed of reinforced concrete or structural steel or steel plate. The apparatus 20 receives water at the upstream end 32 with such water passing through water flow passage 110 to be discharged from the apparatus 20 at downstream end 34 into a water intake.

A relatively small portion of water is not discharged at the downstream end 34 but is instead discharged as a secondary fish diversion flow. The secondary flow passes sequentially through bypass entrance 48, bypass 54, return sluice 56, bottom drop 58, drop basin 60, and return pipe 62. It may be desirable to use pump or other means assist forward movement of the secondary flow.

The drop basin 60 could include secondary screening, enabling a significant portion of the bypass flow to be utilized for power generation. Secondary screening screens fish again using standard screen designs to remove as much water as possible from the secondary flow for return of such removed water to the reservoir, by pump for example. Water returned to the reservoir is then used for power generation.

In its normally-closed position, screen 44 diverts fish upward as fish travel downstream in the water flow passage 110. The screen 44 and transition guide walls 46a and 46b act together to divert fish to the bypass entrance 48. Diverted fish travel with the secondary flow successively through bypass entrance 48, bypass 54, return sluice 56, bottom drop gate 58, drop basin 60, and return pipe 62. Return pipe 62 discharges the fish at a safe location. The fish discharge location is at any preferred safe release location, such as a powerhouse tailrace, a river downstream of a dam, or a headpond.

The trash rack 40 prevents large waterbourne debris from entering water flow passage 110 where it could foul screen 44.

The transition 78a is rounded in order to minimize entrance head losses and provide uniform approach flow conditions. The height of the water flow passage 100 is dependent on the selected screen angle. The depth of the roof 72 below the water level 112 is dependent on the submergence requirements associated with the selected approach velocity to the screen 44.

When screen 44 is pivoted about horizontal shaft 96 to cleaning position 100 (shown in phantom), the screen 44 does not divert fish but instead the downstream face 94b is reversed to face upstream. This reversal of water flow with respect to the screen dislodges small waterbourne debris which may have fouled the screen 44. Screen 44 is pivoted through conventional means such as a dual shaft operator actuated by a motor or hydraulic system.

Stoplog 43 is stored in place within stoplog guide 42 to provide a reasonably continuous roof 72 to minimize the possibility of fish entering the area between the stoplog guide 42 and and stoplog 43. Installation of stoplogs for maintenance of the screen is accomplished by a variety of conventional means including a truck-mounted crane. Stoplogs in their normal raised position do not affect water flow. In their closed position, stoplogs present a barrier to water flow, such barrier allowing dewatering of the water flow passage 100 for easy access and maintenance.

The screen extension 90 enables debris to be flushed from the bypass entrance 48 when the screen is rotated to its cleaning position. The open return sluice 56 and personnel access using the deck 74, which is located above water level, to allow for any trapped debris to be easily removed.

The floor 30a, is level from the trash racks 40 to the upstream end of the screen 44 at screen lip 44a when screen 44 is in its operating position. Screen lip 44a abuts floor 30a when screen 44 is in its normally-closed position. From the screen lip 44a, the floor 30b is recessed. The floor 30b, underneath the screen 44 is, for example, 2.5 feet lower that the floor 30a upstream of the screen lip 44a. Such a floor profile provides a flow area below the bypass 54 equal to the flow area immediately upstream of the screen which creates a uniform flow distribution through the screen, a factor which is important to successful fish diversion and minimization of hydraulic headlosses across the apparatus.

The head loss across the apparatus is approximately 0.5 feet at an approach velocity of 4 fps, and 2.6 feet at an approach velocity of 10 fps.

Plural Embodiment

Figure 3:
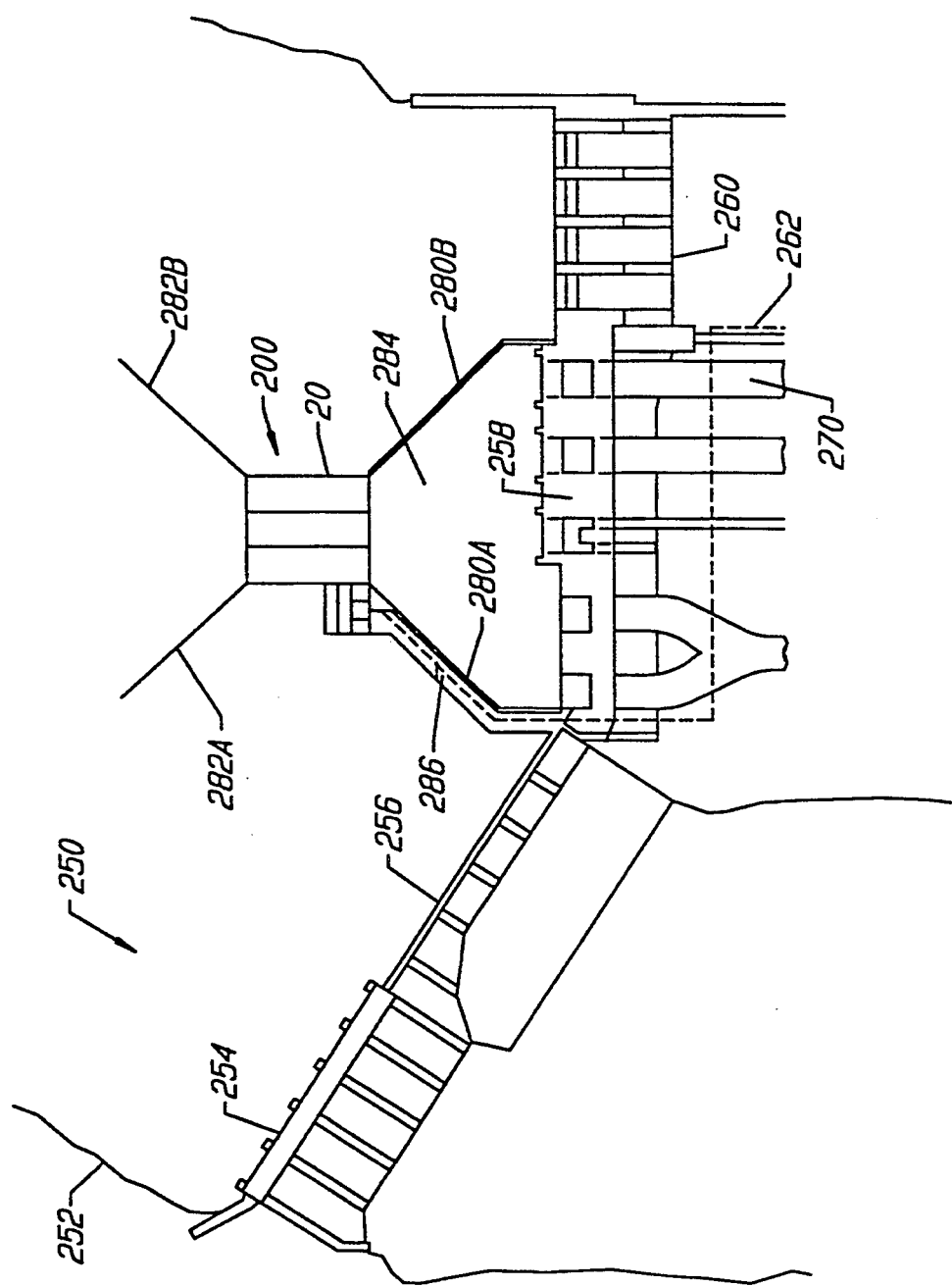
FIG. 3 is a three apparatus configuration using separation walls showing example of the manner in which separation walls and two or more apparatuses may be employed to adapt to site-specific conditions.

Referring now to FIG. 3, there is shown plural apparatus 200 which consists of three apparatuses substantially identical to apparatus 20, except as noted hereinbelow. Before describing in detail plural apparatus 200 it will be useful to describe the example environment disclosed by FIG. 3 in which plural apparatus 200 is installed. A headpond 250 is defined by shoreline 252, gated spillway 254, gravity dam 256, penstock headworks 258, and gated spillway 260. Gated spillway 260 supplies water to fish return channel 262. Penstock headworks 258 includes four penstocks, of which penstock 270 is representative.

In this embodiment, similarly oriented apparatuses 20 are placed parallel, side-by-side, to form a unitary fish diversion consisting of plural apparatus 200. The three water flow passages 110 provided by plural apparatus 200 offers a total water flow capacity that is an integral multiple (three in this embodiment) of the water flow capacity offered by apparatus 20 in its single module embodiment.

Separation walls 280a and 280b are joined to plural apparatus 200 to form forebay 284. Separations walls 280a and 280b, in cooperation with plural apparatus 200, exclude entry of water from the headpond 250 to the forebay 284 except entry through plural apparatus 200. Accessway 286 is provided atop separation wall 280a to allow personnel access from penstock headworks 258 to plural apparatus 200. Lead walls 282a and 282b may be employed to improve water flow conditions to the plural apparatus 200.

In the plural apparatus 200 a common drop basin 60 communicates with a single return pipe 62 which conveys fish from the drop basin 60 to the a safe discharge location which is fish return channel 262 in this embodiment.

Separation walls 280a and 280b and lead walls walls 282a and 282b are constructed of sheetpiling and supported by a framing and piles. Separation walls 280a and 280b and lead walls 282a and 282b are installed in the "wet" using barges, a barge-mount crane, and divers after construction of plural apparatus 200. Plural apparatus is constructed in place in the "dry" using a sheet-pile cofferdam.

It is to be understood that plural apparatus 200 is representative and other embodiments employing apparatus 20 may be profitably employed. For example, a plural apparatus employing two or four apparatuses 20 may be used. Moreover, one apparatus 20 in its single embodiment may be employed in conjunction with separation walls 280a and 280b and lead walls 282a and 282b if desired. Separation walls 280a and 280b may have bypass gates or bypass gates may be built into penstock headworks 258. Site conditions may allow for use of only one separation wall 280a to form forebay 284, for example forming a triangular forebay by abutting the apparatus 20 to shoreline 252 and extending separation wall 280a from a headworks to apparatus 20. Site conditions may further allow for use of only one lead wall 282a to improve water flow conditions to the apparatus 20, for example, by using shoreline 252 to serve the function of the omitted lead wall 282b.

The present invention has been described with reference to its illustrated single apparatus embodiment 20 and plural apparatus 200 embodiment. Persons skilled in the art of such apparatuses may upon exposure to the teachings herein, conceive other variations. Such variations are deemed to be encompassed by the disclosure, the invention being delimited only by the appended claims.

We claim:

1. A fish diversion apparatus for a water intake comprising:
   a. a floor, two opposite side walls, and a roof, all of which collectively define a water flow passage for a water flow to flow through said passage, said passage having a longitudinal axis and further having an upstream aperture for admitting said water flow into said passage and a downstream aperture for discharging said water flow from said passage, wherein dimensions of said floor, walls and roof may be selected to define dimensions of said upstream aperture, said downstream aperture, and said passage;
   b. flow bypass means having an inlet aperture and an outlet aperture, said inlet aperture in fluid communication with said upstream aperture;
   c. a plane screen mounted within said passage and inclined at a specified degree of an angle with respect to said floor said screen defining a fish flow path with cross sectional area decreasing from said upstream aperture to said inlet aperture; and
   d. a separation wall which abuts said downstream aperture and said water intake such that said fish flow path diverts said fish from said passage into said inlet aperture for discharge of said fish from said outlet aperture at a safe location and such that water discharged from said downstream aperture is channeled through a forebay to said water intake.

2. A fish diversion apparatus as recited in claim 1 wherein said separation wall has a bypass gate such that said bypass gate may be opened to allow water to enter said forebay while bypassing said water flow passage.

3. A fish diversion apparatus as recited in claim 1 further comprising a lead wall having an end of said lead wall which abuts said fish diversion apparatus near said upstream aperture such that water flow conditions to said fish diversion apparatus are improved.

4. A fish diversion apparatus as recited in claim 1 further comprising a stoplog guide located near said upstream aperture such that a stoplog installed therein presents a barrier to said water flow into said passage.

5. A fish diversion apparatus as recited in claim 1 further comprising a stoplog guide located near said downstream aperture such that a stoplog may be installed to present a barrier to a water flow into said passage.

6. A fish diversion apparatus as recited in claim 1 further comprising a deck substantially covering said fish diversion apparatus such that maintenance personnel may travel over said deck to gain access to the fish diversion apparatus in general and the flow bypass means in particular.

7. A fish diversion apparatus for a water intake comprising:
   a plurality of fish diversion modules, said modules disposed in parallel, side-by-side placement each said module having;
   a. a water flow passage having a floor, said passage for a water flow to flow through said passage, said passage having an upstream aperture for admitting said water flow into said passage and a downstream aperture for discharging said water flow from said passage;

b. flow bypass means having an inlet aperture and an outlet aperture, said inlet aperture in fluid communication with said upstream aperture;

c. a plane screen mounted within said passage and inclined at a specified degree of an angle with respect to said floor said screen defining a fish flow path with cross sectional area decreasing from said upstream aperture to said inlet aperture, such that said fish flow path diverts said fish from said passage into said inlet aperture for discharge of said fish from said outlet aperture at a safe location; and, d. a first separation wall which abuts a said downstream aperture of a said module and said water intake such that water discharged from said downstream aperture is channeled through a forebay to said water intake.

8. A fish diversion apparatus as recited in claim 7 wherein for each said module said floor has an upstream portion, a downstream portion, and a common junction between said upstream portion and said downstream portion wherein said upstream portion has an upstream elevation and said downstream portion has a downstream elevation different from said upstream elevation.

9. A fish diversion apparatus as recited in claim 8 wherein for each said module said screen has an upstream edge which abuts said common junction and wherein said upstream elevation and said downstream elevation are selected to provide a uniform flow distribution through said screen.

10. A fish diversion apparatus as recited in claim 9 wherein said apparatus further comprises a lead wall having an end of said lead wall which abuts a said module near said upstream aperture of said module such that water flow conditions to said fish diversion apparatus are improved.

11. A fish diversion apparatus as recited in claim 9 wherein each said module further comprises a stoplog guide located near said upstream aperture such that a stoplog installed therein presents a barrier to said primary water flow into said passage.

12. A fish diversion apparatus as recited in claim 11 further comprising a stoplog guide located near said downstream aperture of each said module such that a stoplog may be installed to present a barrier to a water flow into said passage.

13. A fish diversion apparatus as recited in claim 12 further comprising a deck substantially covering each said module such that maintenance personnel may travel over said deck to gain access to the fish diversion apparatus in general and the flow bypass means in particular.

14. A fish diversion apparatus as recited in claim 7 further comprising a separation wall which abuts a said downstream aperture of a said module and said water intake such that water discharged from said downstream aperture is channeled through a forebay to said water intake.

15. A fish diversion apparatus as recited in claim 7 wherein said first separation wall has a bypass gate such that said bypass gate may be opened to allow water to enter said forebay while bypassing said water flow passage.

16. A fish diversion apparatus as recited in claim 7 wherein said apparatus further comprises a lead wall having an end of said lead wall which abuts a said module near said upstream aperture of said module such that water flow conditions to said fish diversion apparatus are improved.

17. A fish diversion apparatus as recited in claim 7 further comprising a second separation wall which abuts a downstream aperture of a said module and said water intake such that both said first separation wall and said second separation wall define said forebay.

18. A fish diversion apparatus for a water intake comprising:

a. a water flow passage for a water flow to flow through said passage, said passage having a floor and having an upstream aperture for admitting said water flow into said passage and a downstream aperture for discharging said water flow from said passage, said floor having an upstream portion, a downstream portion, and a common junction between said upstream portion and said downstream portion wherein said upstream portion has an upstream elevation and said downstream portion has a downstream elevation different from said upstream elevation;

b. flow bypass means having an inlet aperture and an outlet aperture, said inlet aperture in fluid communication with said upstream aperture;

c. a plane screen mounted within said passage such that said fish flow path diverts said fish from said passage into said inlet aperture for discharge of said fish from said outlet aperture at a safe location.

19. A fish diversion apparatus as recited in claim 18 wherein said upstream elevation is above said downstream elevation.

* * * * *